(12) United States Patent
Thomas et al.

(10) Patent No.: US 7,695,064 B2
(45) Date of Patent: Apr. 13, 2010

(54) VEHICLE SEAT SIDE AIR BAG

(75) Inventors: Scott D. Thomas, Novi, MI (US); Nancy C. Evans, Clinton Township, MI (US); William A. Biondo, Beverly Hills, MI (US); Diane K. McQueen, Leonard, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/144,712

(22) Filed: Jun. 24, 2008

(65) Prior Publication Data

US 2009/0315373 A1 Dec. 24, 2009

(51) Int. Cl.
*B60R 21/00* (2006.01)
*B60R 21/20* (2006.01)

(52) U.S. Cl. .............................. 297/216.16; 280/728.3

(58) Field of Classification Search ............ 297/216.13, 297/216.1, 728.3; 280/730.2, 728.1, 728.2
See application file for complete search history.

(56) References Cited

U.S. PATENT DOCUMENTS

| | | | |
|---|---|---|---|
| 5,647,609 A | 7/1997 | Spencer et al. | |
| 5,785,350 A | 7/1998 | Inoue et al. | |
| 5,788,272 A | 8/1998 | Yanase | |
| 5,826,938 A | 10/1998 | Yanase et al. | |
| 5,845,932 A | 12/1998 | Kimura et al. | |
| 5,860,673 A | 1/1999 | Hasegawa et al. | |
| 5,944,341 A | 8/1999 | Kimura et al. | |
| 5,967,603 A * | 10/1999 | Genders et al. | 297/216.13 |
| 5,988,674 A | 11/1999 | Kimura et al. | |
| 6,003,938 A * | 12/1999 | Lachat et al. | 297/216.13 |
| 6,074,003 A | 6/2000 | Umezawa et al. | |
| 6,089,594 A | 7/2000 | Hasegawa et al. | |
| 6,095,602 A | 8/2000 | Umezawa et al. | |
| 6,155,593 A | 12/2000 | Kimura et al. | |
| 6,302,431 B1 * | 10/2001 | Sasaki et al. | 280/728.2 |
| 6,352,304 B1 * | 3/2002 | Sorgenfrei | 297/216.13 |
| 6,357,789 B1 | 3/2002 | Harada et al. | |
| 6,386,577 B1 | 5/2002 | Kan et al. | |
| 6,439,597 B1 | 8/2002 | Harada et al. | |
| 6,478,329 B1 | 11/2002 | Yokoyama | |
| 6,561,540 B1 | 5/2003 | Hasegawa et al. | |
| 6,578,911 B2 | 6/2003 | Harada et al. | |

(Continued)

FOREIGN PATENT DOCUMENTS

DE 102004042039 A1 3/2006

(Continued)

*Primary Examiner*—Milton Nelson, Jr.

(57) ABSTRACT

A vehicle seat includes a seat back frame, a foam cushion mounted on the frame, and an air bag assembly mounted upon the frame within a hollow provided in the cushion. A trim cover covers the cushion and conceals the air bag assembly, and includes a side panel facing the side of the vehicle and a front panel facing forwardly. The side panel and front panel are joined together at a vertical extending separable seam. The side panel has a lower portion and an upper portion joined together at a horizontal extending separable seam located adjacent to the lower edge of the air bag assembly. Upon inflation of the air bag, the inflating air bag forces the side panel outwardly causing separation of the separable seams and enabling the air bag to inflate both forwardly through the vertical extending separable seam and downwardly through the horizontal extending separable seam.

25 Claims, 10 Drawing Sheets

U.S. PATENT DOCUMENTS

| | | |
|---|---|---|
| 6,592,144 B2 | 7/2003 | Acker et al. |
| 6,612,610 B1 | 9/2003 | Aoki et al. |
| 7,021,654 B2 | 4/2006 | Honda et al. |
| 7,093,851 B2 | 8/2006 | Lotspih |
| 7,100,992 B2 | 9/2006 | Bargheer et al. |
| 7,134,686 B2 | 11/2006 | Tracht et al. |
| 7,195,274 B2 | 3/2007 | Tracht |
| 7,195,277 B2 | 3/2007 | Tracht et al. |
| 7,232,150 B2 | 6/2007 | Nagayama |
| 7,281,735 B2 | 10/2007 | Acker et al. |
| 7,284,768 B2 | 10/2007 | Tracht |
| 7,290,791 B2 | 11/2007 | Tracht |
| 7,290,792 B2 | 11/2007 | Tracht |
| 7,290,793 B2 | 11/2007 | Tracht |
| 7,290,794 B2 | 11/2007 | Tracht |
| 7,293,795 B2 | 11/2007 | Kong |
| 2006/0113760 A1 | 6/2006 | Tracht et al. |
| 2006/0113765 A1 | 6/2006 | Tracht |
| 2006/0113766 A1 | 6/2006 | Tracht et al. |
| 2006/0113767 A1 | 6/2006 | Tracht |
| 2006/0113768 A1 | 6/2006 | Tracht et al. |
| 2006/0113769 A1 | 6/2006 | Tracht |
| 2006/0113773 A1 | 6/2006 | Tracht |
| 2006/0163850 A1 | 7/2006 | Inazu et al. |
| 2006/0279074 A1 | 12/2006 | Tracht et al. |
| 2007/0057493 A1 | 3/2007 | Ritzel et al. |
| 2007/0187933 A1 | 8/2007 | Tracht et al. |
| 2007/0222191 A1 | 9/2007 | Tracht |

FOREIGN PATENT DOCUMENTS

| | | |
|---|---|---|
| DE | 102004042114 A1 | 3/2006 |
| DE | 102004044715 A1 | 4/2006 |
| DE | 102005062596 A1 | 7/2007 |
| DE | 102006008168 A1 | 8/2007 |
| DE | 102006014381 A1 | 10/2007 |
| EP | 674333 B1 | 6/2006 |
| EP | 1839963 A2 | 10/2007 |
| WO | 2006108676 A1 | 10/2006 |
| WO | 2006128513 A1 | 12/2006 |
| WO | 2007042011 A2 | 4/2007 |
| WO | 2007073944 A1 | 7/2007 |

* cited by examiner

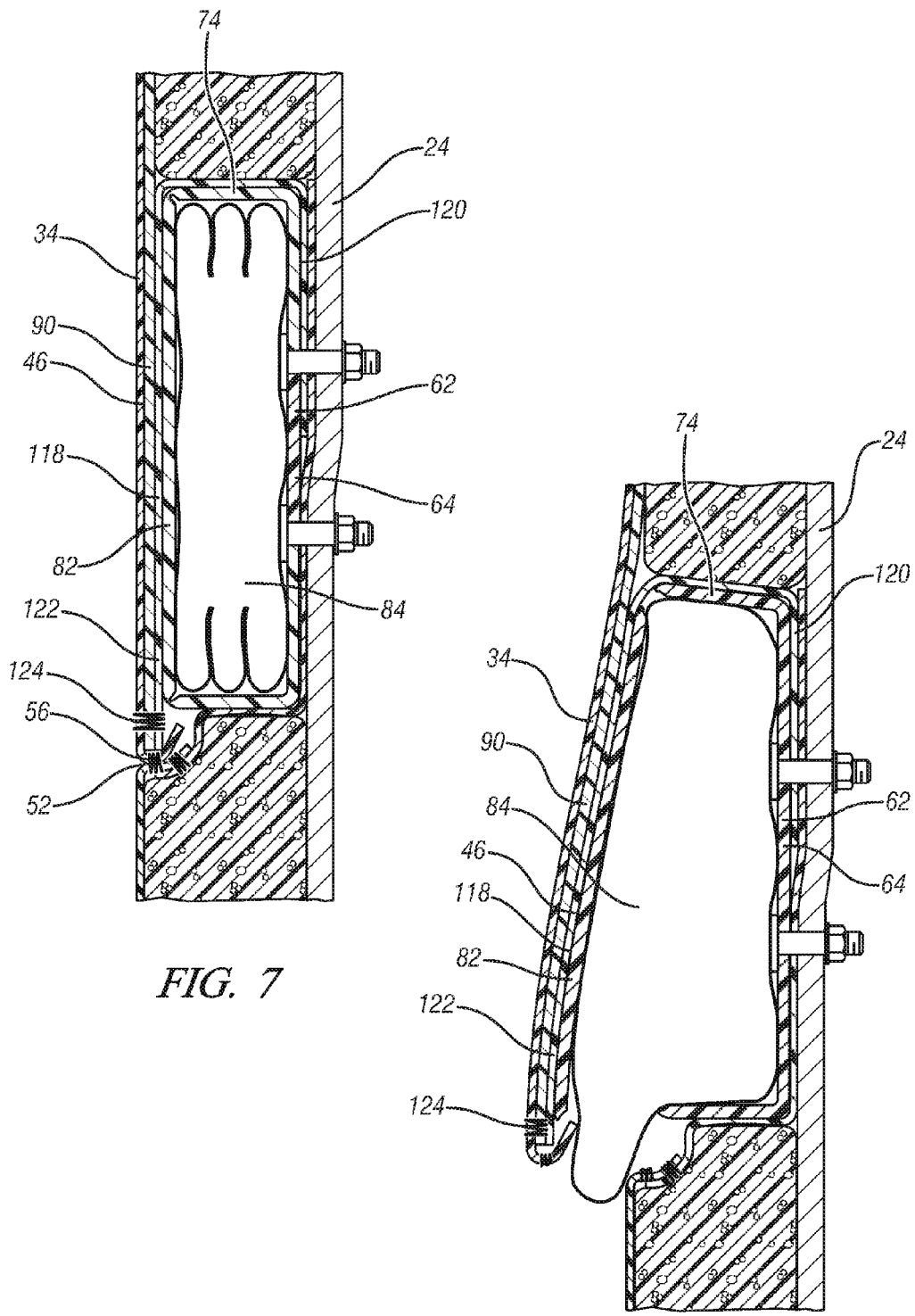

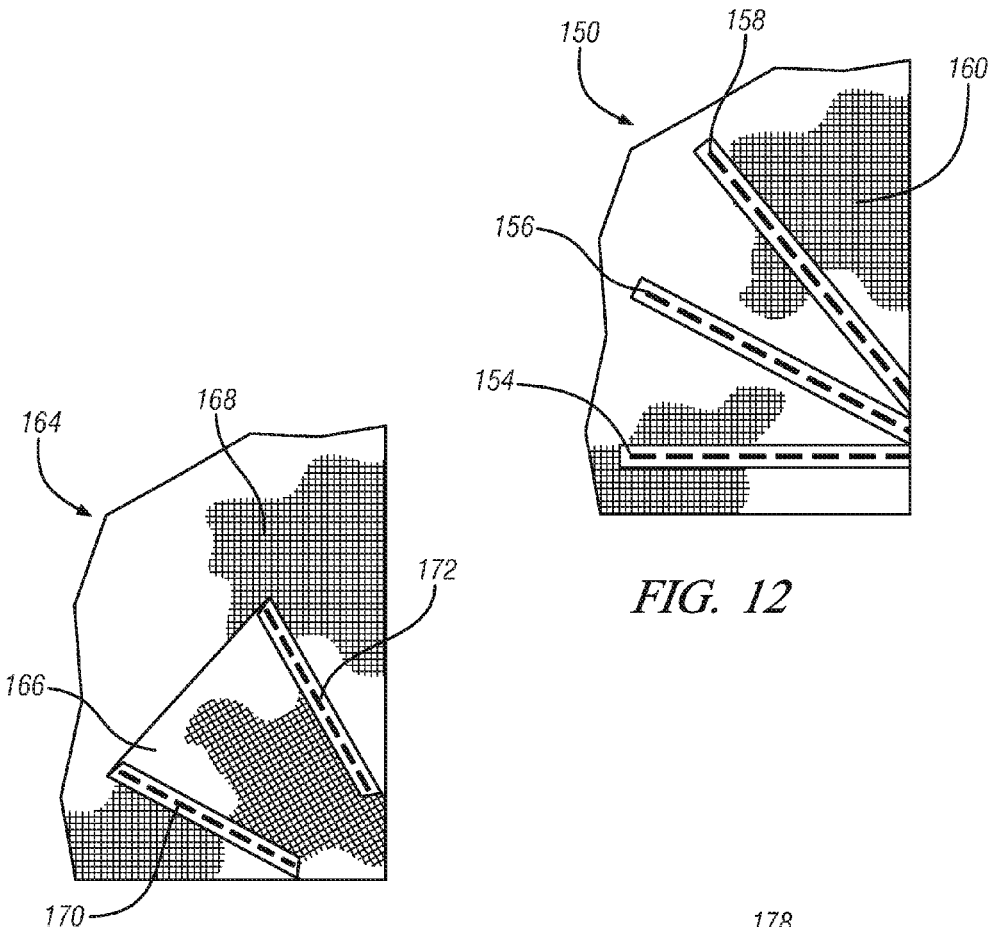
FIG. 12
FIG. 13
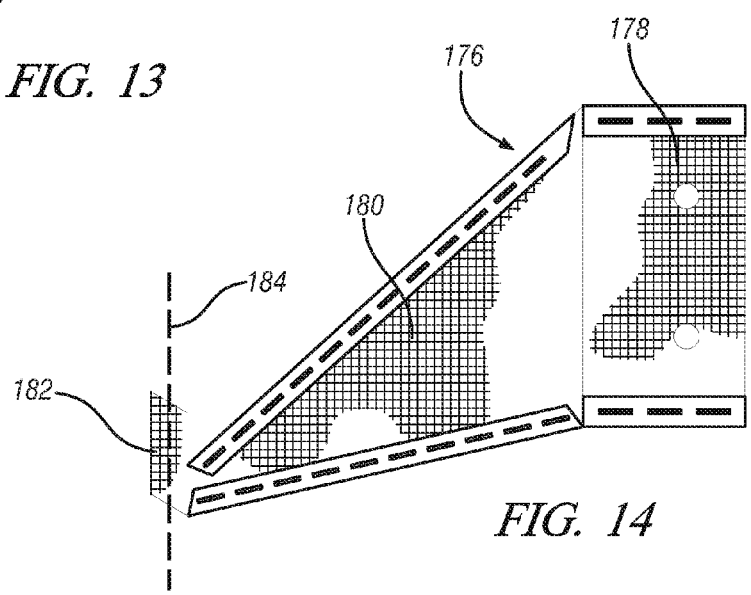
FIG. 14

VEHICLE SEAT SIDE AIR BAG

FIELD OF THE INVENTION

The present invention relates to a vehicle seat having a side impact air bag and more particularly an air bag and seat combination that facilitates the inflation and deployment of the air bag through separable seams provided in the seat cover.

BACKGROUND OF THE INVENTION

It is well known in the automotive industry to provide a vehicle seat having an air bag mounted on the outboard side of the seat back to provide side impact restraint of a seated occupant. The air bag may include a thorax portion that inflates forwardly of the occupant torso, and a pelvis portion that inflates more downwardly and forwardly to restrain the occupant pelvis. The air bag is folded up and stored within an air bag housing that is mounted on the seat back. In some cases a plastic door conceals the folded up air bag and then the door opens to permit the deployment of the air bag forwardly and downwardly. However, it is generally considered to be more aesthetically acceptable to hide the air bag assembly within the seat back beneath the traditional seat cover and to provide the seat trim cover with separable seams that can break apart to permit the air bag to deploy forwardly and downwardly.

It would be desirable to provide an improved vehicle seat with side air bag that would assure the prompt and efficient inflation of the air bag from the seat back to optimize restraint of the occupant.

SUMMARY OF THE INVENTION

A vehicle seat with air bag, includes a seat back frame, a foam seat back cushion mounted on the seat back frame, and an air bag assembly mounted upon the frame within a hollow provided in the cushion. A trim cover covers the cushion and conceals the air bag assembly. The trim cover includes a side panel facing the side of the vehicle and a front panel facing forwardly, the side panel and front panel being joined to one another at a vertical extending separable seam. The side panel also has a lower portion and an upper portion that join one another at a horizontal extending separable seam that is located adjacent to the lower edge of the air bag assembly. On inflation of the air bag, the inflating air bag forces the side panel outwardly causing separation of the separable seams and enabling the air bag to inflate both forwardly through the vertical extending separable seam between the side panel and the front panel of the seat cover and simultaneously to inflate downwardly through the horizontal extending separable seam between the upper portion and lower portion of the side panel.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 7 is a section view similar to the section view of FIG. 3 but showing another embodiment of the invention.

FIG. 8 shows the air bag of FIG. 7 being inflated.

FIG. 12 is a side view showing stiffeners provided on the air bag chute.

FIG. 13 is another embodiment of stiffeners for the air bag chute.

FIG. 14 is another stiffener for the air bag chute.

DETAILED DESCRIPTION OF THE EXEMPLARY EMBODIMENTS

The following description of certain exemplary embodiments is merely exemplary in nature and is not intended to limit the invention, its application, or uses.

Figure 1:
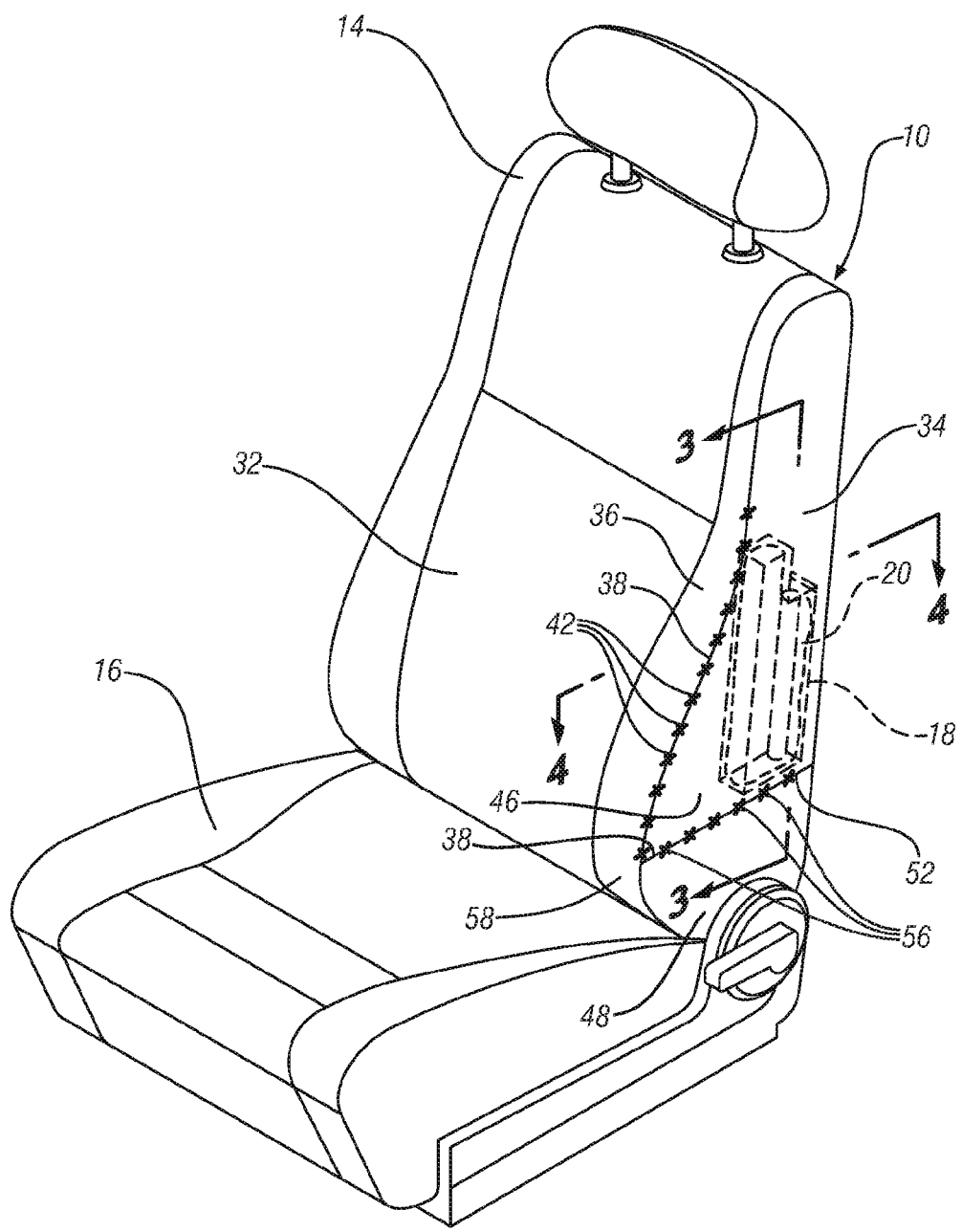
FIG. 1 is a perspective view of a vehicle seat having a side air bag.
Figure 3:
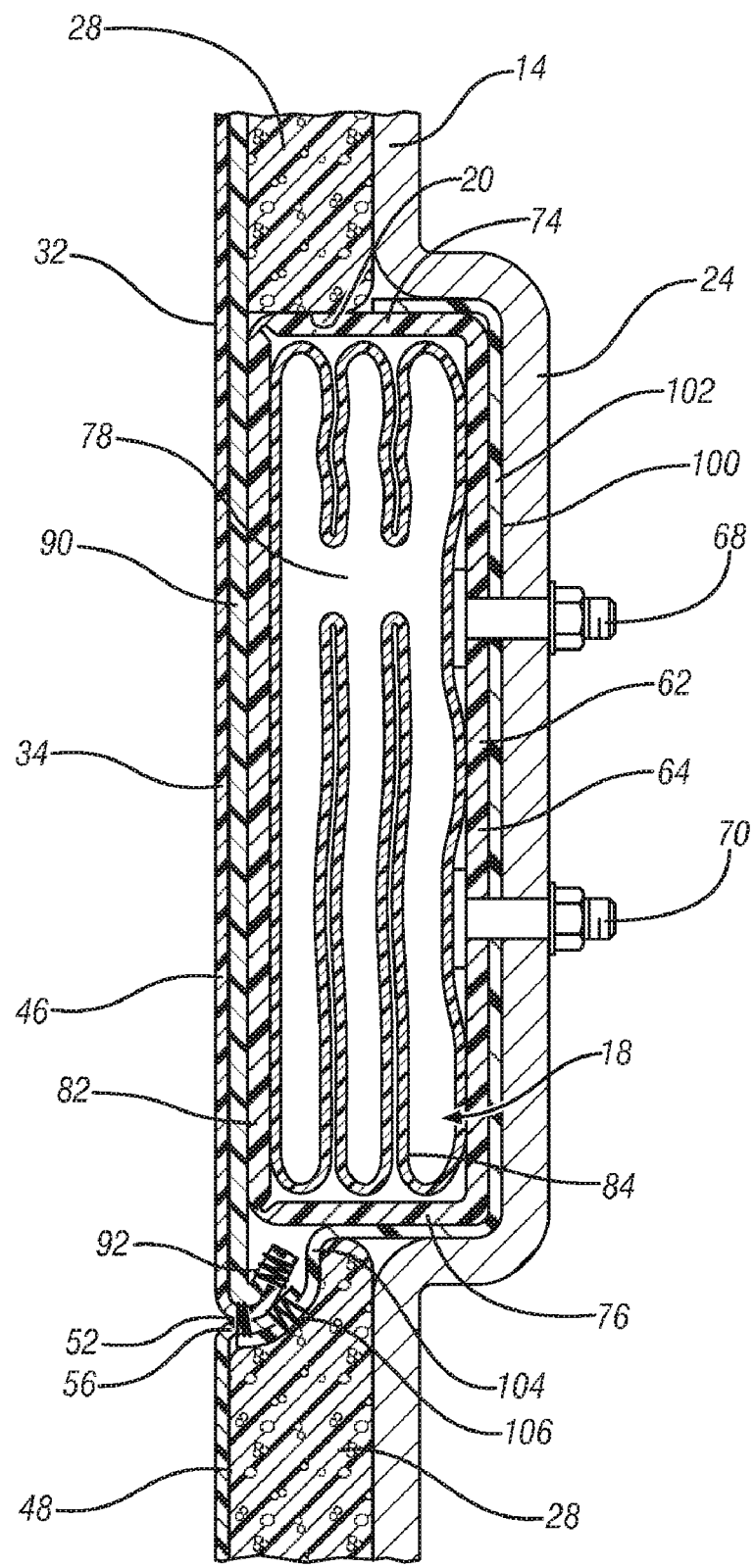
FIG. 3 is a section view taken in the direction of arrows 3-3 of FIG. 1.
Figure 4:
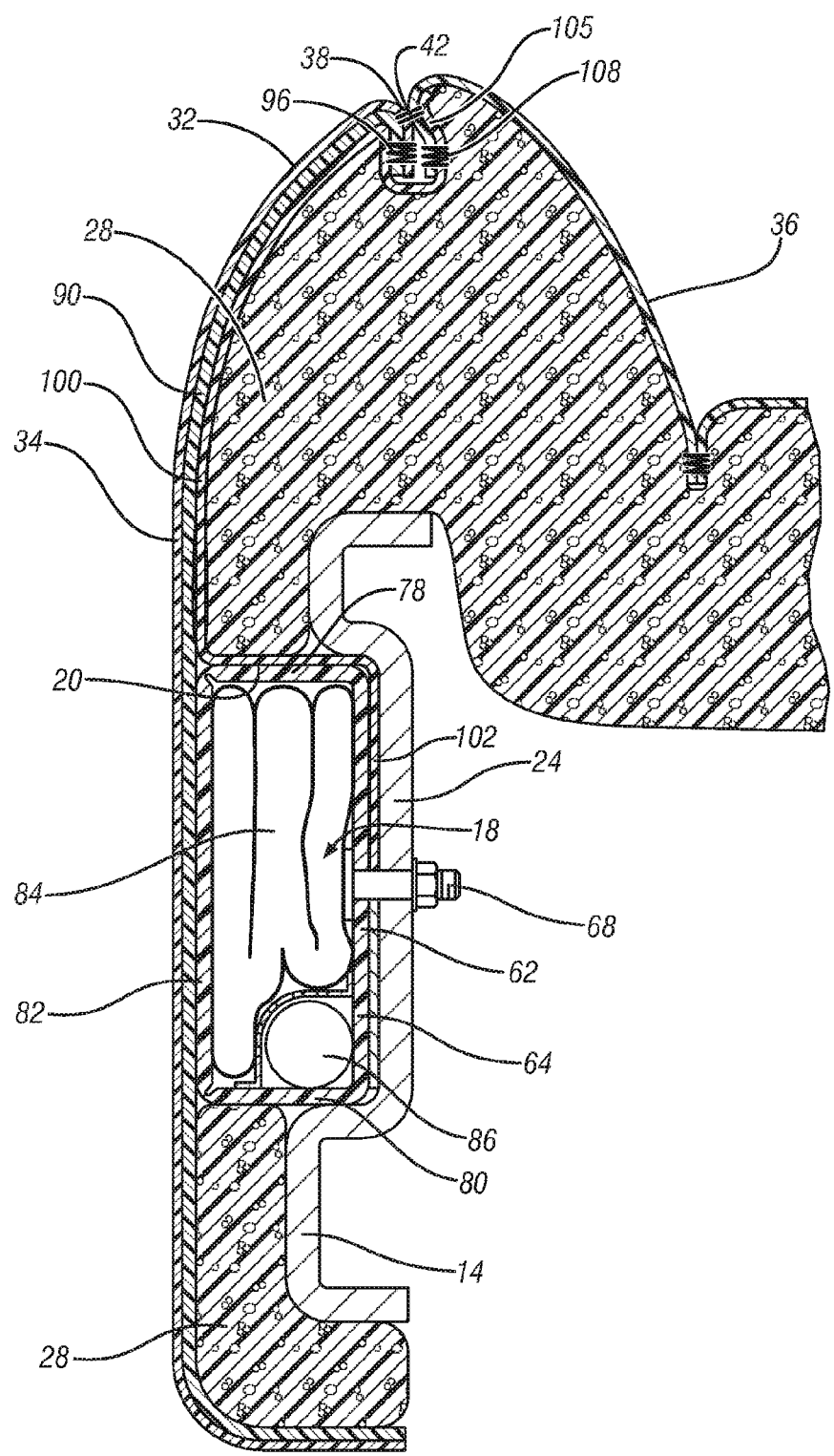
FIG. 4 is a section view taken in the direction of arrows 4-4 of FIG. 1.

Referring to FIGS. 1, 3 and 4, a vehicle seat generally indicated at 10 includes a seat back 14 and a seat bottom 16. An air bag assembly, generally indicated at 18, is mounted within a hollow 20 in the seat back 14. As seen in FIGS. 3 and 4, the seat back 14 includes a seat frame 24 of stamped metal construction. A foam seat cushion 28 covers the frame 24 and is suitably attached thereto. The foam cushion 28 is concealed beneath a seat trim cover 32, such as a woven cloth, vinyl, or leather.

As best seen in FIG. 4, the trim cover 32 includes a side panel 34 and a front panel 36. The side panel 34 and the front panel 36 are joined together at a vertical extending separable seam 38 that is formed by a series of break away stitches 42 that will be overcome upon inflation of the air bag as will be described hereinafter. Referring to FIGS. 1 and 3, the side panel 34 includes an upper portion 46 and a lower portion 48 that are joined together at a horizontal extending separable tear seam 52 provided by a series of break away stitches 56 that are provided between the lower edge of the upper portion 46 and the upper edge of the lower portion 48. Referring again to FIG. 1, it is seen that the break away stitches 42 forming the vertical extending tear seam 38 and the break away stitches 56 forming the horizontal extending tear seam 52 intersect with one another at tear seam intersection 58 so that the overall shape of the separable seams 38 and 52 is an L-shaped geometric arrangement adjacent the air bag assembly 18 on the outboard side of the seat back 14.

Referring to FIGS. 3 and 4, it is seen that the air bag assembly 18 includes an air bag housing 62 having a base wall 64 that is attached to the seat frame 24 by bolts 68 and 70. The housing 62 has side walls including upper side wall 74, lower side wall 76, front side wall 78 and rear side wall 80. The side walls 74, 76, 78 and 80 are connected by a break away cover 82 that conceals a folded up air bag 84 and an inflater 86. The air bag housing is conventionally constructed of plastic or fabric or a combination of plastic and fabric.

Referring to FIG. 3, it is seen that the side panel 3446 of the seat cover is lined with an outer chute 90 that has a lower end sewed to the lower end of the side panel 34 by stitches at 92. And, as seen in FIG. 4, the outer chute 90 also has a forward end which is sewn to the forward end of the side panel 34 adjacent to the separable seam 38 by stitches 96. The outer chute 90 is of a material that is less stretchable than the trim cover 32 material of the side panel 34 and has a smooth surface finish to allow the low friction passage of the air bag 84 there against.

FIGS. 3 and 4 also show an inner chute 100 that has a base portion 102 that is captured between the base wall 64 of the air bag housing 62 and the seat frame 24 to fixedly anchor the inner chute 100. As seen in FIG. 3, the inner chute 100 includes a lower edge portion 104 that extends downwardly and is sewn to the lower portion 48 of the side panel 34 by stitches at 106. FIG. 4 shows that the inner chute 100 extends forwardly between the foam cushion 28 and the side panel 34 all the way forward to the separable seam 38 where the forwardmost end 105 of the inner chute 100 is sewn to the front panel 36 of the seat cover by stitches 108. The inner chute 100 is made of a material that is less stretchable and than the foam cushion 28 and offers a smooth low friction surface to allow the low friction passage of the air bag 84 there against.

Figure 2:
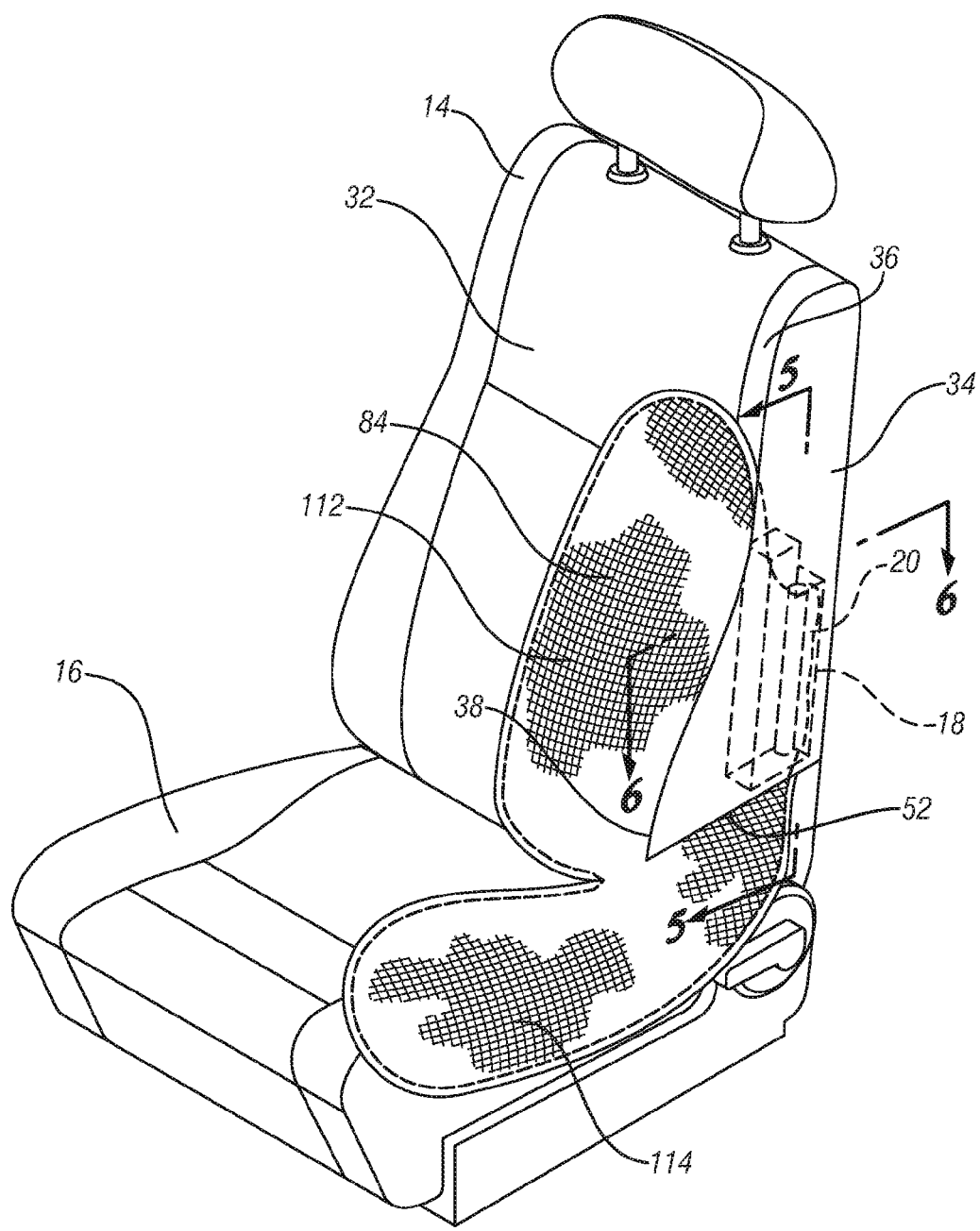
FIG. 2 is a view similar to FIG. 1 but showing the air bag to have been inflated and deployed as permitted by separation of separable seams of the seat trim cover.
Figure 5:
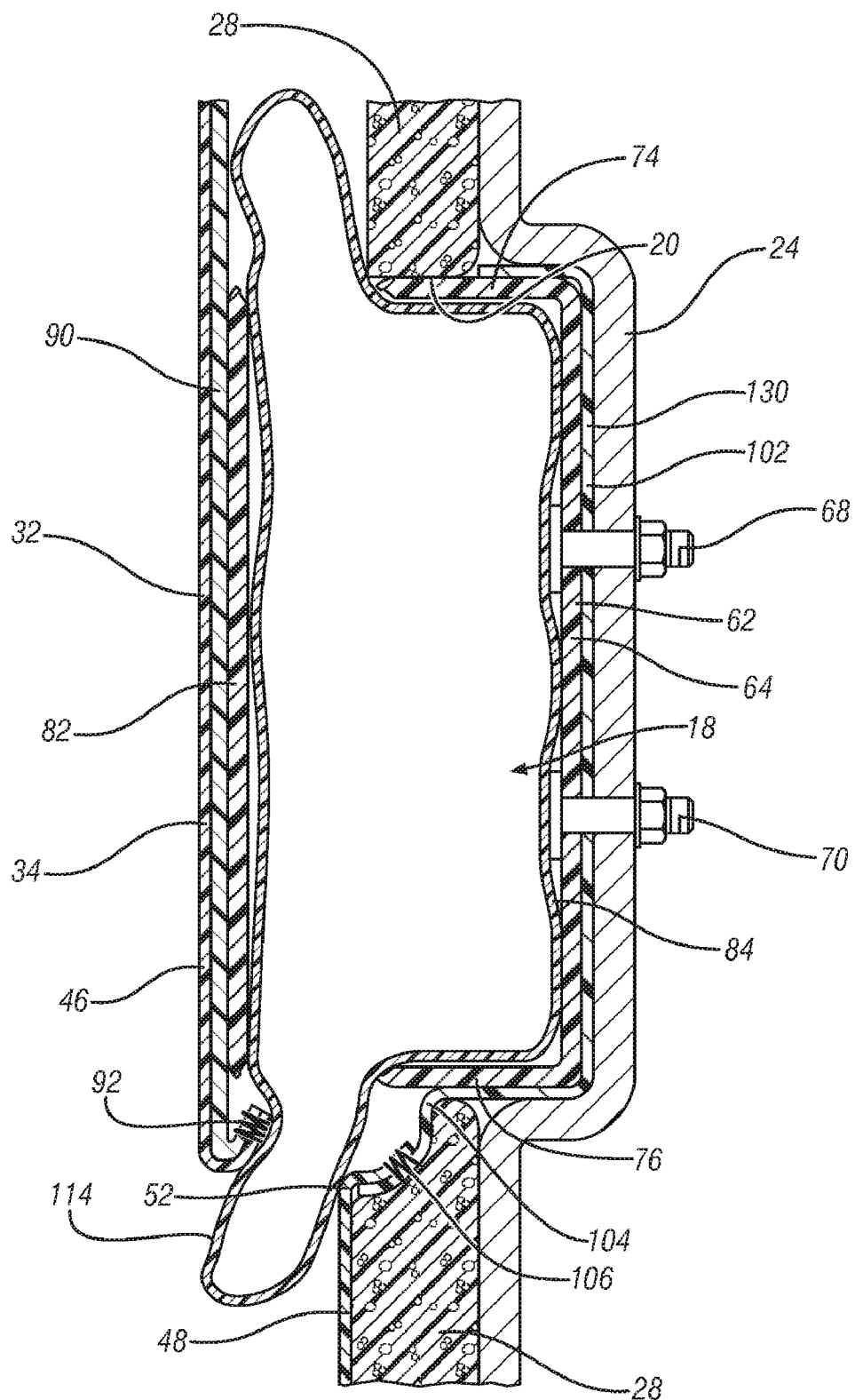
FIG. 5 is a view similar to FIG. 3 but showing the air bag being inflated and causing a separation of the horizontal extending separable seam.
Figure 6:
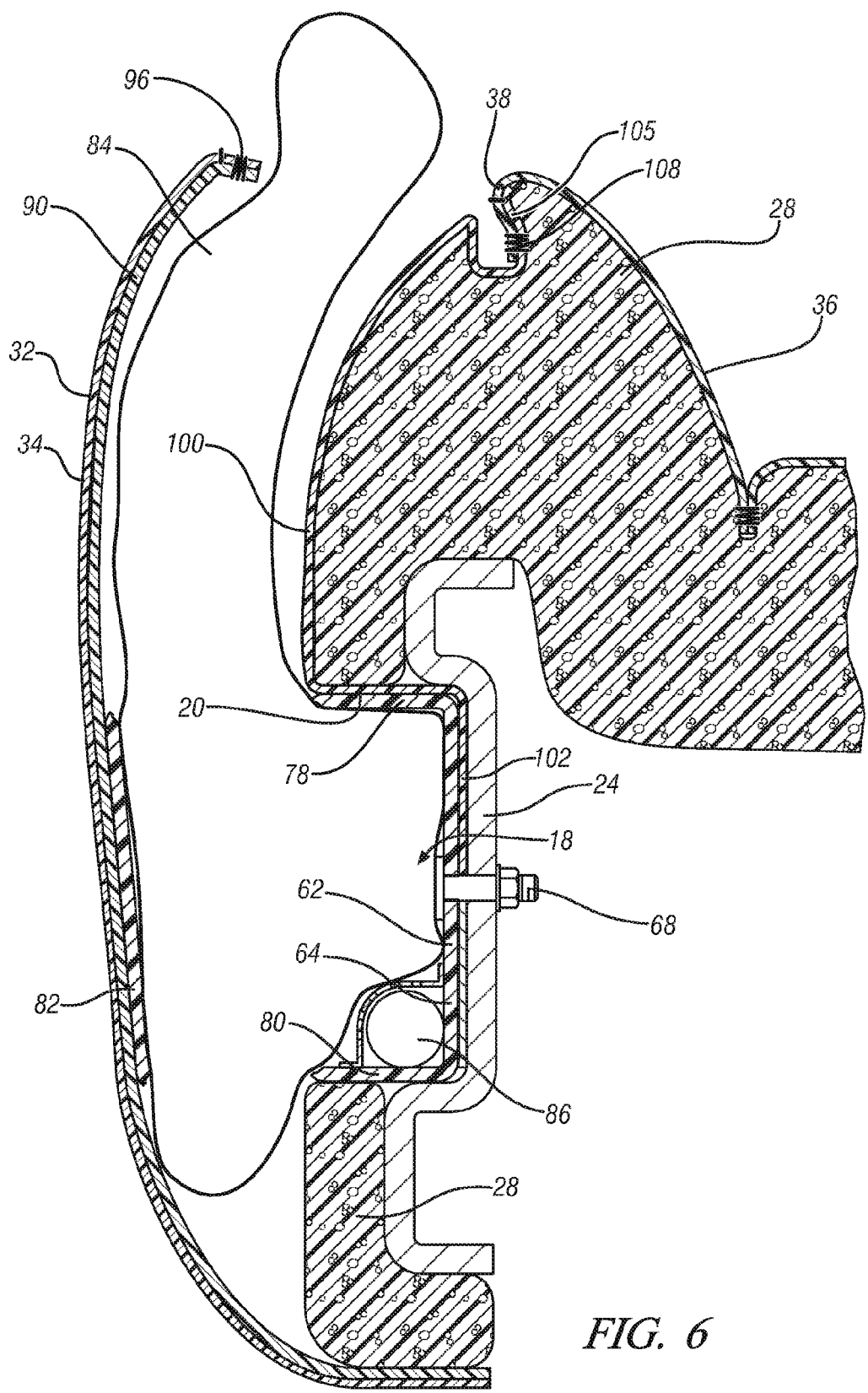
FIG. 6 is a section view similar to FIG. 4 but showing the air bag being inflated and causing separation of the vertical extending separable seam.

FIGS. 2, 5 and 6 show the inflation of the air bag assembly 18. In particular, FIG. 2 shows that the air bag 84 includes an upper thorax portion 112 and a lower pelvis portion 114. In FIG. 5, it is seen that upon activation of the inflater 86 the air bag 84, including both its upper thorax portion 112 and the lower pelvis portion 114, have begun to inflate outwardly of the air bag housing 62 as permitted by break away of the breakaway cover 82. As seen in FIG. 5, the horizontally extending separable seam 52 at the lower edge of the air bag housing 62 has been separated, by the breaking of the stitches 56 to permit the emergence of the lower pelvis portion 114, and, as shown in FIG. 6, the emergence of the upper thorax portion 112 has likewise caused the opening of the vertical extending separable seam 38 via the breaking of the breakaway stitches 42 at the juncture between the side panel 34 and the front panel 36. It will be understood that during the inflation of the air bag 84, the outer chute 100 will function to prevent stretching of the side panel 34 so that the force of the air bag 84 acting upon the outer chute 90 will be transmitted effectively to the break away stitches 42 and 56. Likewise, the inner chute 100 will function in a similar manner to effectively anchor and restrain both the lower portion of the side panel 34 and the front panel 36 so that the force generated by the inflating air bag 84 is effectively focused at the break away stitches 42 and 56. Thus as seen in FIG. 2, the vertical extending separable seam 38 and the horizontal extending separable seam 52, will enable the inflating air bag to efficiently break out of its stored and hidden position of FIG. 1 to expedite its arrival at the fully inflated occupant restraining positions of FIG. 2.

FIGS. 7 and 8 show another embodiment of the invention in which an initiator band 118 is added to the structure shown in FIG. 5. In particular, FIG. 7 shows that the initiator band 118 has a base portion 120 that is anchored between the base wall 64 of air bag housing 62 and frame 24. The initiator band 118 reaches over the upper side wall 74 of the air bag housing 62 and extends downwardly between the break away cover 82 and the outer chute 90. The lowermost end 122 of the initiator band 118 is attached by stitches 124 to the lowermost ends of the upper portion 46 of the side panel 34 and to the lowermost end of the chute 90. Accordingly, upon activation of the air bag inflator 86, and inflation of the air bag 84, the initiator band 118 is tensioned and thrust leftwardly as viewed in FIG. 8 by the opening of the breakaway cover 82. Accordingly, the initiator band 118 will function to transmit and focus force directly to the breakaway stitches 56 of the horizontal extending separable seam 52 to facilitate the rapid deployment of the air bag 84. The initiator band 118 will be sized and oriented to tune the air bag deployment. For example, the initiator band 118 can be sized to have dimensions so that it substantially overlies the dimensions of the break away cover 82, or the initiator band 118 can be either larger than or smaller than the break away cover 82. The initiator band 118 can be one or more individual straps of an inch wide, and can be oriented to angle out diagonally toward the intersection 58 of the vertical extending separable seam 38 and the horizontal extending separable seam 52 of FIG. 1. The initiator band 118 can alternatively be sewn directly into the separable seam 52 so that the load applied to the initiator band 118 during deployment will be directly transmitted into the separable seam 52. In addition, the initiator band 118 can wrap around the rear wall 80 of the air bag housing 62 and extend to be sewn into or near to the vertical extending separable seam 38 so that the vertically separable seam 38 is also tensioned by the initiator band 118 during the deployment.

Figure 9:
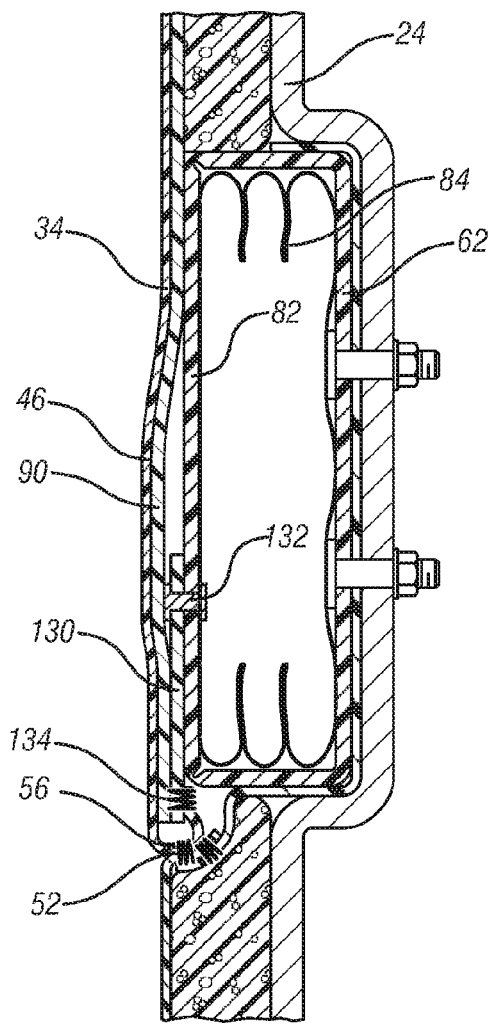
FIG. 9 is another section view similar to FIGS. 3 and 7 and 8 but showing another embodiment of the invention.

FIG. 9 shows another embodiment of the invention in which an initiator band 130 is added to the structure shown in FIG. 5. In particular, FIG. 9 shows that the initiator band 130 is a piece of plastic or fabric attached to the breakaway cover 82 by a rivet 132, or other mechanical attachment. The lowermost end of the initiator band 130 is attached by stitches 134 to the lowermost ends of the upper portion 46 of the side panel 34 and to the lowermost end of the outer chute 90. Accordingly, upon activation of the air bag inflator 86, and inflation of the air bag 84, the initiator band 130 is tensioned by the opening of the breakaway cover 82 and will function to transmit and focus force directly to the breakaway stitches 56 of the horizontal extending separable seam 52 to facilitate the rapid deployment of the air bag 84. The initiator band 130 can be sized and oriented to tune the air bag deployment. For example, the initiator band 130 can be the sized to have dimensions so that it substantially overlies the dimension of the break away cover 82, or the initiator band 130 can be either larger or smaller than the break away cover 82. For example, the initiator band 130 can one or more individual straps of an inch wide, and can be oriented to angle out diagonally toward the intersection 58 of the vertical extending separable seam 38 and the horizontal extending separable seam 52 of FIG. 1. The initiator band 130 can alternatively be sewn directly into the separable seam 52 so that the load applied to the initiator band 130 during deployment will be directly transmitted into the separable seam 52. In addition, the initiator band 130 can wrap around the rear wall 80 of the air bag housing 62 and extend to be sewn into or near to the vertical extending separable seam 38 so that the vertically separable seam 38 is also tensioned by the initiator band 130 during the deployment.

Figure 10:
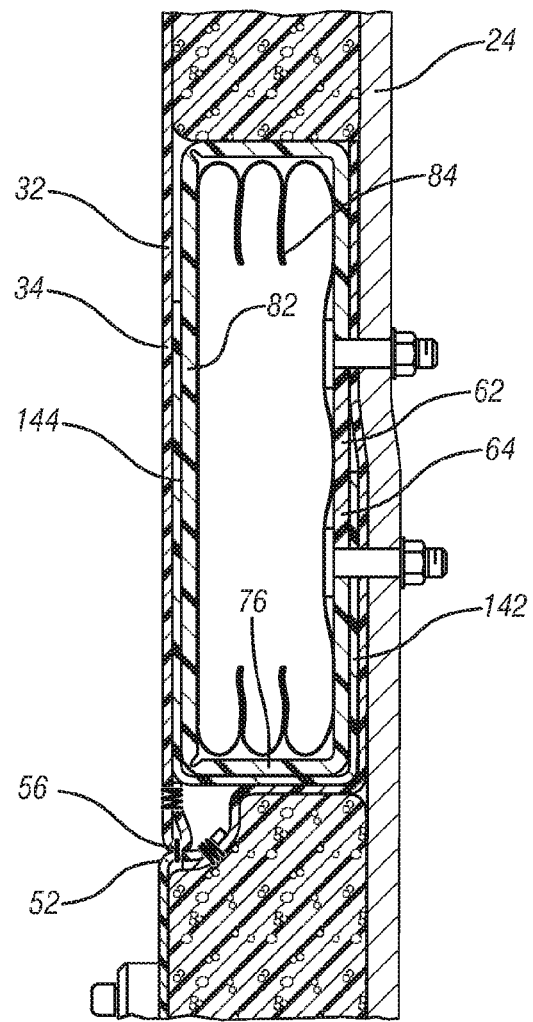
FIG. 10 is another section view similar to FIGS. 3, 7, 8 and 9, and showing yet another embodiment of the invention.
Figure 11:
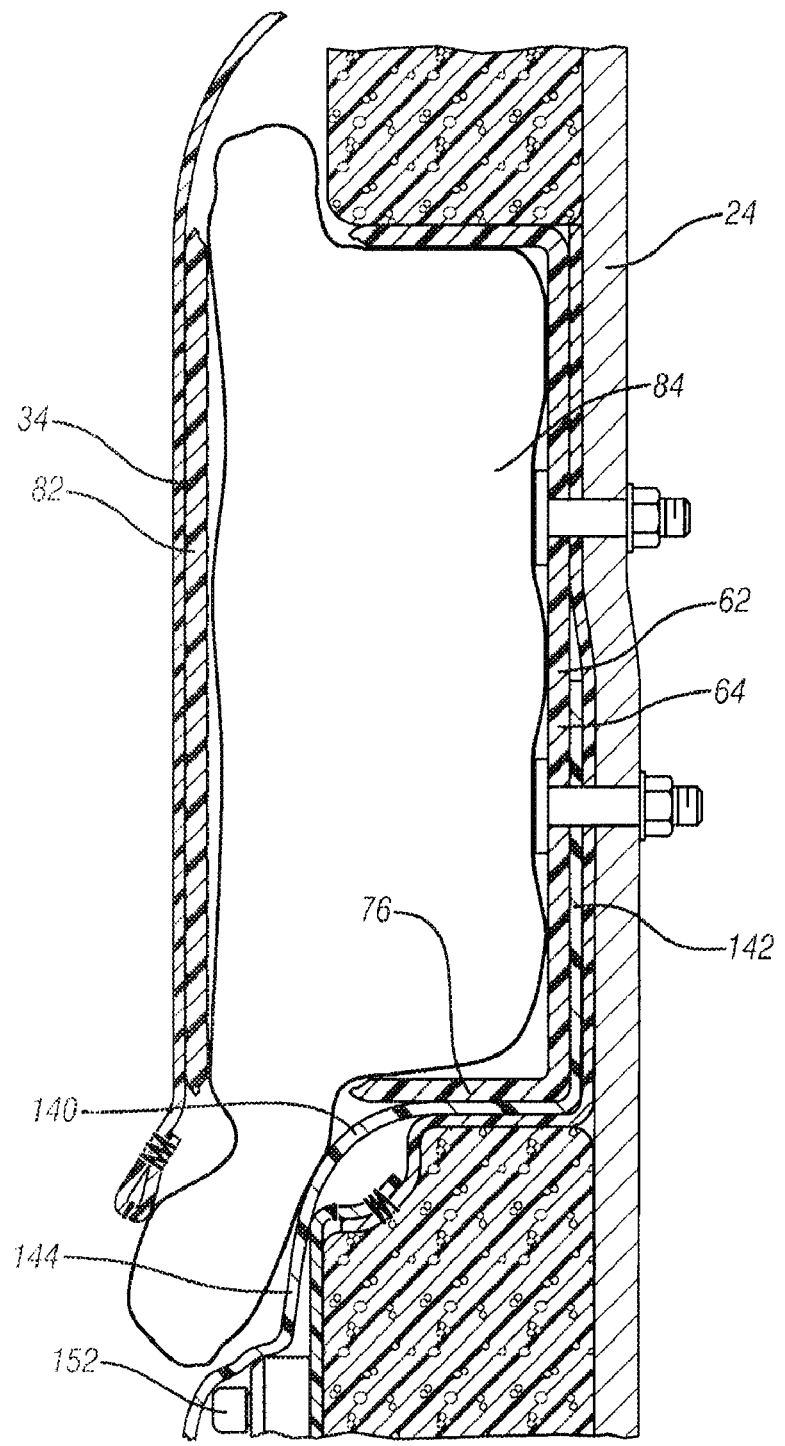
FIG. 11 is a section view corresponding to FIG. 10 and showing the air bag of FIG. 10 being inflated.

FIGS. 10 and 11 show another embodiment of the invention in which an initiator band or flap 140 is added to the structure shown in FIG. 5. In particular, FIG. 10 shows that the initiator band 140 is a piece of plastic or fabric having a base portion 142 that is anchored between base wall 64 of air bag housing 62 and the frame 24. The initiator band 140 reaches under the lower side wall 76 of the air bag housing 62 and has a tongue portion 144 that extends upwardly between the break away cover 82 and the side panel 34. Accordingly, upon activation of the air bag inflator 86, and inflation of the air bag 84, the initiator band 140 will be pressured by the force of the air bag and opening of the breakaway cover 82 and will thereby function to transmit and focus force away from the breakaway stitches 56 of the horizontal extending separable seam 52 under the initiator band 140 to facilitate rapid breakage away from the tear seam portion adjacent to the initiator band 140. As seen in FIG. 11, the tongue portion 144 of the initiator band 140 will lie down upon and cover a seat recliner handle 152 or other structure that might otherwise be contacted by the deploying air bag 84. Thus the initiator band 140 of FIGS. 10 and 11 functions to both focus the force on the tear stitches and to also cover the seat recliner handle. The initiator band 140 can be sized and oriented to tune the air bag deployment. For example, the initiator band 140 can be the sized to have dimensions so that it substantially overlies the dimension of the break away cover 82, or the initiator band 140 can be either larger of smaller than the break away cover 82. In addition, the initiator band 140 can be sized and position to also extend to the region of the vertical extending tear seam 38.

FIGS. 12 and 13 show different examples of stiffening structures that can be added to either or both of the outer chute 90 or the inner chute 100 to direct the air bag deployment force into the regions of the separable seams in order to optimize the breakout of the air bag 84. In FIG. 12, the stiffening structure, generally indicated at 150, includes three separate strips 154, 156, and 158 of fabric or plastic that is sewn or otherwise attached to the sheet 160 of the chute material. These stiffeners will reinforce the chute against stretching, and thereby focus the transmission of force to assist in breaking the breakaway stitches of the separable seams at selected localized regions. Furthermore, by proper selection of the length, location, and angle of orientation of the strips, the deployment can be further varied and tuned as desired.

In FIG. 13, the stiffening structure, generally indicated at 164, includes a piece 166 of fabric or plastic that has turned over edges 170 and 172 that are sewn or otherwise attached to the sheet 168 of the chute material. This stiffening structure 164, in effect doubles and triples the thickness of the chute, in selected areas, to limit the stretching of the chute and thereby focus the transmission of force to assist in breaking the breakaway stitches of the separable seams at selected localized regions. Furthermore, by proper selection of the length, size, location, number, thickness and angle of orientation of the stiffener 164 the deployment can be further varied and tuned as desired.

FIG. 14 shows another variant of an initiating band, generally indicated at 176 and including a base portion 178 that will be anchored adjacent the base wall 64 of the of the air bag housing 62, and a generally triangle shaped wall 180 having an end flap 182 that is adapted to be sewn directly into the breakaway threads of the separable seam that is represented by reference numeral 184. The edges of the triangle shaped walls may be sewn to the chute, or not, as desired. Thus the band 176 will reinforce the chute against stretching, and, furthermore, by its connection directly into the breakaway threads, assist in breading the breakaway stitches of the separable seams. The tip of the initiator band 176 is folded over and places tension transmitted by the initiator band on the lower stitch of the breakaway threads, thereby focusing force on this stitch to enable rapid fracture. Furthermore, by proper selection of the length, location, and angle of orientation of the strips, the deployment can be further varied and tuned as desired.

It will be understood that the drawings herein show just one example of the implementation of the invention, and that various variations can be made within the scope thereof. For example, the drawings herein show a separable seam provided by a series of breakaway thread attaching together adjacent seat trim cover panels, however, the invention herein can be used in conjunction with the alternative types of separable seams known in the industry. The separable seam can be formed by Velcro, snap attachments, interlocking hooks, or other separable structures know to be useful for attaching together adjacent trim cover panel portions. The separable seam can be integral to the trim cover, for example, a line of weakened material or slotted material. The separable seams may be continuous or discontinuous. The rearward and forward ends of the outer chute 90 may continue rearward and be attached to the seat structure, be sewn into the side panel 34, wrap around the air bag housing 62 and be anchored adjacent the air bag housing 62, or attached to the seat foam 28. Also, the vertical separable seam 38 can also be located completely within the side panel 34, so that the material on both sides of the seam are side panel material.

Although the drawings FIGS. 1 and 4 show the vertically extending separable seam 38 as located on that part of the seat back that faces forward toward the front of the vehicle, it will be understood that the juncture of the side panel 34 and the front panel 36 can be positioned more to the side of the seat to face more toward the side of the vehicle. In addition, the side panel 34 can have its upper portion 46 made of trim cover material, typically fabric, leather or vinyl, and the lower portion 48 made of a more rigid molded plastic.

What is claimed is:

1. A vehicle seat with an air bag comprising:
   a seat back frame;
   a foam seat back cushion;
   an air bag assembly mounted upon the frame within a hollow in the cushion and having a lower edge and an inflatable air bag;
   a trim cover for covering the cushion and concealing the air bag assembly; said trim cover including generally a side panel and a front panel that join to one another at a vertical extending separable seam, said side panel having a lower portion and an upper portion that join one another at a horizontal extending separable seam adjacent the lower edge of the air bag assembly;
   so that upon inflation of the air bag the inflating air bag forces the side panel outwardly causing separation of both of the separable seams and enabling the air bag to inflate both forwardly through the vertical extending separable seam, and simultaneously to inflate downwardly through the horizontal extending separable seam between the upper portion and the lower portion of the side panel.

2. The vehicle seat with an air bag of claim 1 further comprising: an inner chute panel fixedly mounted inboard the air bag assembly and having a forward end extending therefrom between the side panel and the cushion to the front panel and being attached to the front panel to fix the front panel against movement and thereby focus the force of the inflating air bag at the vertically extending separable seam to expedite the separation of the separable seams and the inflation of the air bag.

3. The vehicle seat with an air bag of claim 2 further comprising a stiffener structure attached to the inner chute panel for stiffening the inner chute panel against stretching to focus the force of the inflating air bag at the separable seam.

4. The vehicle seat with an air bag of claim 1 further comprising: an inner chute panel fixedly mounted inboard the air bag assembly and having a forward end extending between the side panel and the cushion to the front panel and being attached to the front panel, and a lower end extending therefrom into attachment with the lower portion of the side panel; said inner chute panel acting during the inflating of the air bag to fix the front panel and the lower portion of the side panel against movement and thereby focusing the force of the inflating air bag at both of the separable seams to expedite the separation of both of the separable seams and the inflation of the air bag.

5. The vehicle seat with an air bag of claim 4 further comprising: said inner chute panel being fixed to one of said trim cover, said seat back frame, said foam cushion, or said air bag or by the air bag assembly being attached to the seat back frame by fasteners and the inner chute panel being attached to the seat back frame and air bag assembly by the fasteners.

6. The vehicle seat with an air bag of claim 1 further comprising: an upper air bag portion deployed forwardly through the vertical extending separable seam between the side panel and front panel of the seat cover, and a lower air bag portion deployed downwardly through the horizontally separable seam between the upper portion and the lower portion of the side panel.

7. The vehicle seat with an air bag of claim 1 further comprising:
an upper air bag portion deployed forwardly through the separable seam between the side panel and front panel of the seat cover, and a lower air bag portion deployed downwardly through the separable seam between the upper portion and the lower portion of the side panel;
and an inner chute panel fixedly mounted inboard the air bag assembly and having a forward end extending therefrom between the side panel and the cushion to the front panel and being attached to the front panel, and a lower end extending therefrom into attachment with the lower portion of the side panel; said inner chute panel acting during the inflating of the air bag to fix the front panel and the lower portion of the side panel against movement and thereby focusing the force of the inflating air bag at the separable seams to expedite the separation of the separable seams and the inflation of the air bag.

8. The vehicle seat with an air bag of claim 1 further comprising an outer chute panel lining the panel and extending between the side panel and the air bag to stiffen the side panel against stretching and provide a low friction surface for passage of the inflating air bag.

9. The vehicle seat with an air bag of claim 8 further comprising fasteners attaching the air bag assembly to the frame and said outer chute panel being fixed to one of said seat back frame, said cushion, said air bag assembly, or the fasteners.

10. The vehicle seat with an air bag of claim 1 further comprising said upper portion and lower portion of the side panel both being of the trim cover material.

11. The vehicle seat with an air bag of claim 1 further comprising said upper portion of the side panel being a flexible seat cover material, and the lower portion being a molded plastic material.

12. The vehicle seat with an air bag of claim 1 further comprising: an inner chute panel fixedly mounted inboard the air bag assembly and having a lower end extending therefrom into attachment with the lower portion of the side panel, said inner chute panel acting during the inflating of the air bag to fix the lower portion of the side panel against movement and thereby focusing the force of the inflating air bag at the horizontal extending separable seam to expedite the separation of the separable seams and the inflation of the air bag.

13. The vehicle seat with an air bag of claim 1 further comprising an initiator band that lies between the air bag assembly and the side panel and upon the inflation of the air bag the initiator band is tensioned and displaced outwardly in advance of the inflating air bag and transmits and focuses force to initiate the separation of the separable seam.

14. The vehicle seat with an air bag of claim 13 further comprising said initiator band being attached to the side panel adjacent to the separable seam and pulling on the side panel adjacent to the separable seam when the initiator band is displaced by the deploying air bag.

15. The vehicle seat with an air bag of claim 13 further comprising said initiator band having an end sewn directly into the separable seam to directly separate the separable seam when the initiator band is displaced by the deploying air bag.

16. The vehicle seat with an air bag of claim 13 further comprising said initiator band overlapping the separable seam without being sewn into or adjacent to the separable seam and focuses the air bags force away from the initiator band.

17. The vehicle seat with an air bag of claim 13 further comprising said seat having seat structure including an operating handle mounted thereon below the horizontal extending seam, and said initiator band being extended upon inflation of the air bag to lie down and cover the seat structure that would otherwise be contacted directly by the deploying air bag.

18. The vehicle seat with an air bag of claim 13 further comprising fasteners attaching the air bag assembly to the seat back frame and said initiator band having a fixed end opposite to the separable seam, and said fixed end being attached to one of the trim cover, the seat back frame, the seat foam cushion, the air bag, or the fasteners.

19. A vehicle seat with an air bag comprising:
a seat back frame;
a foam seat back cushion;
an air bag assembly mounted upon the frame within a hollow in the cushion and having a lower edge and an inflatable air bag;
a trim cover for covering the cushion and concealing the air bag assembly; said trim cover including generally a side panel and a front panel that join to one another at a vertical extending separable seam; said side panel having a lower portion and an upper portion that join one another at a horizontal extending separable seam adjacent the lower edge of the air bag assembly;
an inner chute panel fixedly mounted inboard the air bag assembly and having a forward end extending therefrom between the side panel and the cushion to the front panel and being attached to the front panel, and a lower end extending therefrom into attachment with the lower portion of the side panel;
so that upon inflation of the air bag assembly the inflating air bag forces the side panel outwardly causing separation of the separable seams and enabling the air bag to inflate both forwardly through the vertical extending separable seam between the side panel and front panel of the seat cover, and simultaneously to inflate downwardly through the horizontal extending separable seam between the upper portion and the lower portion of the side panel; said inner chute panel acting during the inflating of the air bag to fix the front panel and the lower portion of the side panel against movement and thereby focusing the force of the inflating air bag at the separable seams to expedite the separation of the separable seams and the inflation of the air bag.

20. The vehicle seat with an air bag of claim 19 further comprising an initiator band that functions to transmit and focus forces into the separable seam region to expedite the separation of the separable seam.

21. The vehicle seat with an air bag of claim 19 further comprising said chute inner panel being fixed to one of said seat back frame, said cushion or said air bag assembly.

22. The vehicle seat with an air bag of claim 19 further comprising said upper portion and lower portion of the side panel both being of the same material as the trim cover material.

23. The vehicle seat with an air bag of claim 19 further comprising said upper portion of the side panel being a flexible trim cover material, and the lower portion being a molded plastic material.

24. The vehicle seat with an air bag of claim 19 further comprising a stiffener structure attached to the inner chute panel for stiffening the inner chute panel against stretching to focus the force of the inflating air bag at the separable seam.

25. The vehicle seat with an air bag of claim 19 further comprising an outer chute panel lining the side panel and extending between the side panel and the air bag to stiffen the side panel against stretching and provide a low friction surface for passage of the inflating air bag.

* * * * *